United States Patent [19]

Wang

[11] Patent Number: 4,959,892
[45] Date of Patent: Oct. 2, 1990

[54] STRUCTURE OF SHAFTLESS CLIP

[76] Inventor: Bor-Jou Wang, 3/F No. 740, Ching Chen Road, Yung-Ho Taipai Hsien, Taiwan

[21] Appl. No.: 481,265

[22] Filed: Feb. 20, 1990

[51] Int. Cl.$^5$ .......................... A41F 1/00; A44B 21/00
[52] U.S. Cl. ......................................... 24/510; 24/489; 24/499
[58] Field of Search ................. 24/510, 489, 498, 499, 24/500, 501, 502, 517

[56] References Cited

U.S. PATENT DOCUMENTS

| Re. 32,269 | 10/1986 | Bisk et al. | 24/501 |
| 3,349,453 | 10/1967 | Chiyoichi et al. | 24/510 |
| 3,456,262 | 7/1969 | Coon | 24/501 |
| 4,722,120 | 2/1988 | Lu | 24/489 |

Primary Examiner—Victor N. Sakran
Attorney, Agent, or Firm—Lowe, Price, LeBlanc, Becker & Shur

[57] ABSTRACT

A shaftless clip for clamping name plate, paper and etc., which is comprised of two pivoted parts with a spring retained therebetween to force the two pivoted parts to constantly clamp up together. The first part of the clip comprises two side pins respectively inserted in two side slots of the two side walls of the second part, and an unitary frame structure for the setting therein of the spring permitting the two legs of the spring to respectively strop against the inner surface of the first and second parts.

1 Claim, 4 Drawing Sheets

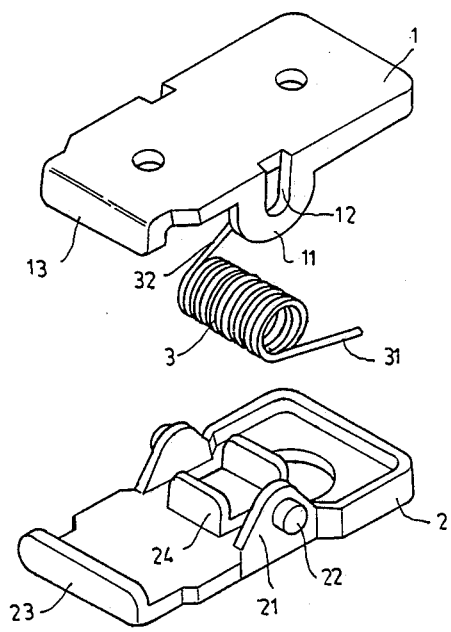
FIG·1
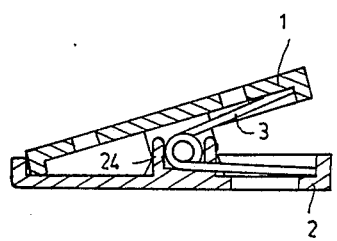
FIG·2

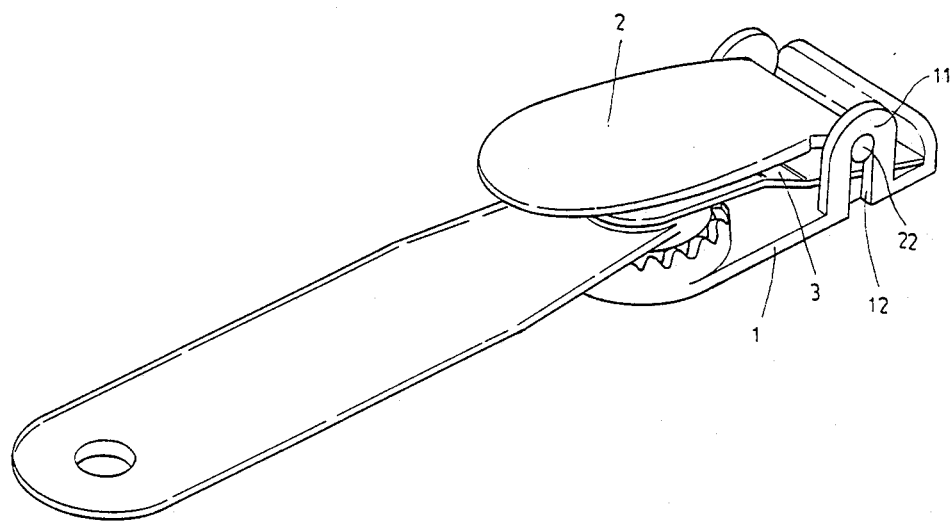
FIG·3

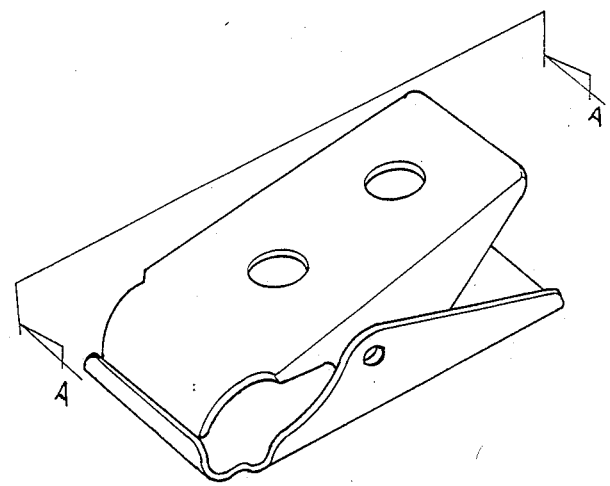
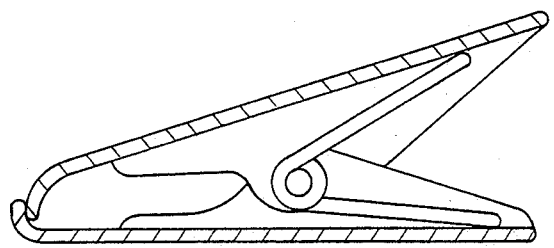
A—A
FIG·5

STRUCTURE OF SHAFTLESS CLIP

BACKGROUND OF THE INVENTION

Conventional clips, either for clamping a name plate on one's clothes or for clamping papers, are generally made of metal material through press punching process. FIG. 5 illustrates a kind of such conventional clips, in which a shaft is made to penetrate through the upper and lower clamping plates thereof for the positioning of a spring therein. After the positioning of the shaft, it must be secured by rivet or certain fastening means. One disadvantage of the said conventional clips is that injury tends to happen during assembly. Another disadvantage of the said conventional clips is that the metal material of the clamping plates is easy to gather rust. The present invention is to provide a kind of shaftless clip which is easy and inexpensive to manufacture, safe and practical in use, and can efficiently eliminate the aforesaid problems.

One object of the present invention is to provide such a shaftless clip which is easy to assemble, inexpensive to manufacture, safe and practical in use.

Another object of the present invention is to provide such a shaftless clip which utilizes an unitary frame structure on one of the two pivoted parts for the positioning therein of a spring which forces the two pivoted parts to clamp up together.

Still another object of the present invention is to provide such a shaftless clip which is made of resilient plastic material in assorted colors for choice.

SUMMARY OF THE INVENTION

The present invention is to provide a kind of shaftless clip which utilizes the elastic resilient property of plastic material to let two clamping plates to be pivoted together by means of the insertion of the two side pins of a first clamping plate in the two slots of the two side boards of a second clamping plate with a spring retained therebetween to force the two clamping plates to constantly clamp up together. By means of the said arrangement, no shaft is required for the positioning of a spring, assorted colors of clips can be provided for choice, and safety operation can be ensured.

BRIEF DESCRIPTION OF THE DRAWINGS

FIG. 1 is a perspective exploded view of a shaftless clip to the present invention;

Fig. 2 is a side elevation of a shaftless clip according to the present invention;

Fig. 3 is an embodiment of name plate clip constructed according to the present invention;

Fig. 5 is a perspective structural view of a clip according to the prior art.

DESCRIPTION OF THE DESIGNATED NUMERALS

Figure 4:
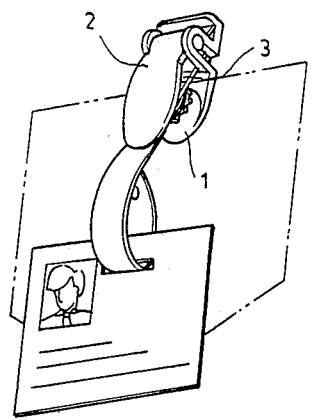
FIG. 4 illustrates, the use of the name plate clip of FIG. 3 to clamp a name plate.

| | |
|---|---|
| (1) Upper clamping plate | (11) Side board |
| (12) Slot | (13) Upper jaw portion |
| (2) Lower clamping plate | (21) Lug |
| (22) Pin | (23) Lower jaw portion |
| (24) U-shaped frame structure | (3) Spring |
| (31) Right end rod | (32) Left end rod |

DETAILED DESCRIPTION OF THE PREFERRED EMBODIMENTS

Turning now to the annexed drawings in greater detail and referring first to FIGS. 1 and 2, therein illustrated is a shaftless clip in accordance with the present invention and generally comprised of an upper clamping plate (1), a lower clamping plate (2) and a spring (3). The upper clamping plate (1) comprises a downwardly vertical side board (11) each on its both sides, of which each vertical side board comprises therein a slot (12), and an unitary jaw portion (13) extending downward from its front end. The lower clamping plate (2) comprises an upstanding lug (21) each on its both sides, of which each upstanding lug (21) comprises an unitary pin (22) transversely extending outward, and an unitary jaw portion (23) extending upward from its front end. The upper clamping plate (1) and the lower clamping plate (2) are designed to match with each other so that the pins (22) of the two upstanding lugs (21) of the lower clamping plate (2) can be respectively inserted in the two slots (12) of the two side boards (11) of the upper clamping plate (1), and the upper jaw portion (13) can be forced by the spring (3) to constantly clamp up with the lower jaw portion (23) of the lower clamping plate (2). The upper camping plate (1) and the lower clamping plate (2) are made of resilient plastic material such that the elastic resilient property of the plastic material can facilitate the assembly and reinforce the engagement of the upper clamping plate (1) with the lower clamping plate (2). The lower clamping plate (2) further comprises an U-shaped frame structure (24) on its upper surface and spaced from its two upstanding lugs (21) for the positioning therein of the spring (3). During assembly, the spring (3) is set in the frame structure (24) of the lower clamping plate (2) with its both right and left end rods (31) and (32) respectively stopped against inner surface of the lower clamping plate (2) and the upper clamping plate (1) at a rear side to force the upper jaw portion (13) to constantly engage with the lower jaw portion (23).

Referring to FIGS. 3 and 4, there is illustrated an embodiment of name plate clip according to the present invention, in which an upper clamping plate (2) is pivoted with a lower clamping plate (1) with its two side pins (22) respectively retained in the two slots (12) of the two side boards of the lower clamping plate (1) to retain a spring (3) therebetween, which spring (3) serves to force the front ends of the upper and lower clamping plates (2) and (1) to constantly engage with each other. In this embodiment, the upper and lower clamping plates (2) and (1) are also made of resilient plastic material so that the elastic resilient property of the plastic material itself can facilitate the assembly and reinforce the engagement of the upper clamping plate (2) with the lower clamping plate (1).

As described above, the present invention is to provide such a shaftless clip which utilizes the elastic resilient property of plastic material to secure the engagement of the upper and lower clamping plates thereof, and which is easy to assemble and safe in use. According to the present invention, assorted colors of clips can be made for choice.

What is claimed is:

1. A shaftless clip, including a first clamping plate pivoted with a second clamping plate with a spring retained therebetween, wherein said first clamping plate comprises two downwardly vertical side boards on its both sides and an unitary jaw portion extending downward from its front end, said side boards comprising therein a slot each, and said second clamping plate comprises two upstanding lugs on its both sides, said upstanding lugs comprising each an unitary pin transversely extending outward and inserted in the slot of either side board of said first clamping plate, an unitary jaw portion extending upward from its front end, and an U-shaped frame structure on its upper surface for the positioning therein of said spring, and wherein said spring having two ends respectively stropped against the inner surface of said first and second clamping plates to force said the jaw portions thereof to constantly engage together.

* * * * *